O. G. WOOLVERTON.
HOOF PAD.
APPLICATION FILED MAY 25, 1908.
914,003.
Patented Mar. 2, 1909.
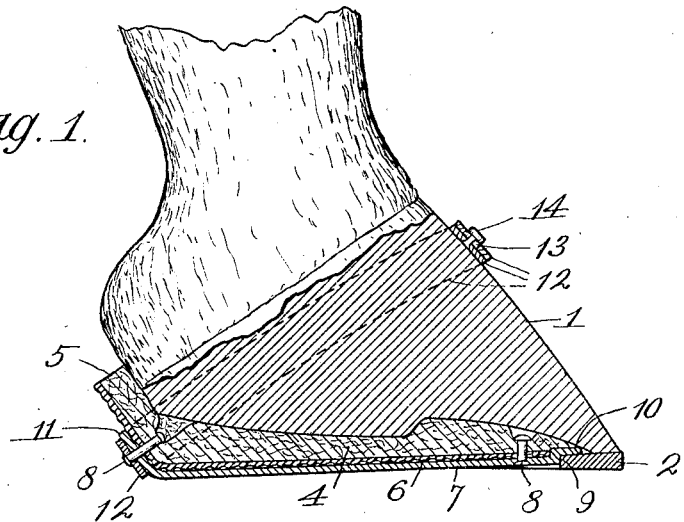
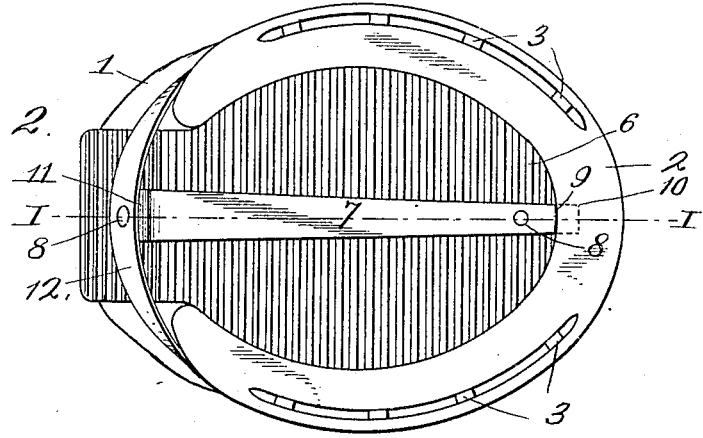
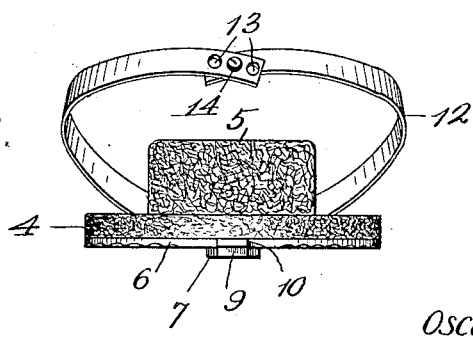
WITNESSES:
INVENTOR:
Oscar G. Woolverton,
BY
ATTORNEY.

UNITED STATES PATENT OFFICE.

OSCAR G. WOOLVERTON, OF TOPEKA, KANSAS.

HOOF-PAD.

No. 914,003.     Specification of Letters Patent.     Patented March 2, 1909.

Application filed May 25, 1908. Serial No. 434,709.

*To all whom it may concern:*

Be it known that I, OSCAR G. WOOLVERTON, a citizen of the United States, residing at Topeka, in the county of Shawnee and State of Kansas, have invented certain new and useful Improvements in Hoof-Pads, of which the following is a specification.

My invention relates to improvements in hoof-pads for horses and other shod animals; and the invention embraces an absorbent pad which may be either medicated or saturated with water and applied to the heel and the bottom of the hoof for the prevention or cure of disease and injuries, and for the purpose of keeping the heel and the bottom of the hoof clean, moist, and soft.

The invention further embraces a non-absorbent sole for keeping the absorbent pad in a clean and sanitary condition.

The invention also embraces a presser-member for creating pressure on the heel and the frog for the purpose of preventing or curing contraction of the same.

Other features of the invention will hereinafter appear, and in order that the same may be fully understood, reference will now be made to the accompanying drawing, in which:

Figure 1 represents a vertical central section of the invention, on line I—I of Fig. 2, applied to a hoof. Fig. 2 is an inverted plan view of the same. Fig. 3 is a front elevation of the invention removed from the hoof.

1 designates a hoof to which a shoe 2 is secured by nails 3 in the ordinary manner.

4 designates an absorbent pad which is formed to fit snugly against the bottom of the hoof and is provided with an extension 5 which fits snugly against the heel of the hoof. Said pad may be saturated with water to keep the heel and the bottom of the hoof moist and soft, or it may be medicated for the prevention or cure of disease and injuries. The pad is kept in a clean and sanitary condition by a nonabsorbent sole 6, which covers the bottom of the pad and its extension 5, as shown in Figs. 1 and 2. The bottom of the sole is, preferably, corrugated as shown to prevent the animal from slipping.

7 designates a presser-member secured to the sole and the pad by any desired means, rivets 8 being shown for this purpose. Said member is provided at its forward end with a shoulder 9 and a lip 10, which latter engages the upper surface of shoe 2 to assist in holding the pad in position, shoulder 9 engaging the inner edge of the shoe to prevent the member moving forward far enough to allow the end of lip 10 to enter the toe of the hoof and also engaging the front end of sole plate 6. Said member is also provided with a rearwardly and upwardly-inclined extension 11 for holding the extension 5 of the pad against the heel of the hoof.

Member 7 and the bottom of the pad slope downwardly at their rear ends below the lower surface of the shoe, so that when the animal places the latter squarely upon the ground member 7 will be forced upwardly by the pressure thereon and will in turn force the pad and its extension against the bottom and the heel of the hoof. The pressure thus exerted will tend to spread the frog and the heel and thus prevent or cure contraction of the same.

The device is releasably secured in position on the hoof by a clasp 12 composed of a strap secured to the rear portion of the pad and member 7 by one of the rivets 8. The sides of the strap are adapted to snugly embrace the hoof, and one end thereof is provided with holes 13, while its opposite end is provided with a button 14 adapted to engage any of the holes. This arrangement permits the device to be applied to hoofs of different sizes.

Although the pad is intended primarily to be worn in the stable, it may be worn on the street on account of the secure manner in which it is fastened to the hoof.

While I have shown the preferred construction of the invention, I, of course, reserve the right to make such changes in the details of construction and arrangement of parts as properly fall within the spirit and scope of the appended claim.

Having thus described my invention, what I claim is:—

A hoof pad composed of a pad member fitting against the bottom and heel of a shod hoof, a sole formed of a plate engaging on the under face of said pad member being formed to conform to the contour of the inner face of the shoe and having a rear upwardly inclined extension formed of a contracted continuation of said plate, said extension covering the heel portion of said pad member, a presser member, composed of a strip of metal having its front end formed with a shoulder and a forwardly extending lip, said presser member being disposed on the under face of said sole plate to brace and strengthen the same, a rivet passed through said pad member, said sole plate and said presser member at the front thereof, said presser member having its rear end enlarged and directed upward at an incline so as to support said sole plate extension, and a securing strap engaged on the outer face of said rear end of the presser member, a rivet passed through said pad member, said rear extension of the sole plate, said rear end of the presser member and said strap, the front end of said sole plate engaging the rear face of said shoulder of the presser member, the lip of said presser member engaging the inner face of the door adjacent the bottom of the hoof.

In testimony whereof I affix my signature, in the presence of two witnesses.

OSCAR G. WOOLVERTON.

Witnesses:
W. W. WIKIDAL,
CHAS. EAGLE.